United States Patent
Satapathy et al.

(10) Patent No.: US 8,880,082 B2
(45) Date of Patent: *Nov. 4, 2014

(54) METHOD AND SYSTEM FOR EXTENDING MULTIPLE INPUT MULTIPLE OUTPUT WIRELESS SERVICE

(71) Applicant: Sprint Spectrum L.P., Overland Park, KS (US)

(72) Inventors: Durga Satapathy, Olathe, KS (US); Ivy Kelly, Overland Park, KS (US); Walter Rausch, Shawnee, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 85 days.

This patent is subject to a terminal disclaimer.

(21) Appl. No.: 13/762,105

(22) Filed: Feb. 7, 2013

(65) Prior Publication Data

US 2013/0155979 A1    Jun. 20, 2013

Related U.S. Application Data

(63) Continuation of application No. 12/035,783, filed on Feb. 22, 2008, now Pat. No. 8,391,875.

(51) Int. Cl.
| | |
|---|---|
| *H04W 40/00* | (2009.01) |
| *H04B 7/14* | (2006.01) |
| *H04W 72/04* | (2009.01) |
| *H04W 88/08* | (2009.01) |
| *H04L 1/06* | (2006.01) |
| *H04L 1/00* | (2006.01) |
| *H04B 7/04* | (2006.01) |

(52) U.S. Cl.
CPC .......... *H04W 72/042* (2013.01); *H04W 88/085* (2013.01); *H04L 1/0618* (2013.01); *H04L 2001/0097* (2013.01); *H04B 7/0413* (2013.01)
USPC ............ 455/446; 455/445; 455/449; 370/315

(58) Field of Classification Search
USPC ......... 455/443, 444, 445, 446, 448, 449, 555, 455/561, 562.1; 370/315
See application file for complete search history.

(56) References Cited

U.S. PATENT DOCUMENTS

| | | | |
|---|---|---|---|
| 6,535,731 | B1 | 3/2003 | Pillekamp et al. |
| 6,684,058 | B1 | 1/2004 | Karacaoglu et al. |
| 7,209,739 | B1 | 4/2007 | Narayanabhatla |
| 7,336,923 | B2 | 2/2008 | Yadav |
| 7,697,930 | B2 | 4/2010 | Miao et al. |
| 7,830,817 | B1 | 11/2010 | Oh et al. |
| 7,925,270 | B1 | 4/2011 | Johnson |
| 2002/0087724 | A1 | 7/2002 | Datta et al. |
| 2002/0137517 | A1 | 9/2002 | Williams et al. |

(Continued)

*Primary Examiner* — Christopher M Brandt (57) ABSTRACT

Disclosed herein is a method and system for extending MIMO service in a wireless communications system. The system comprises a base station, a remote system, and a host system communicatively coupled to the base station and the remote system. The base station is configured to generate, from a baseband signal, a downlink signal comprising a plurality of downlink signal streams, including at least a first downlink signal stream and a second downlink signal stream. Accordingly, the base station may include a first and a second antenna that are configured to transmit the first and second downlink signal streams, respectively. The remote system provides wireless service in a remote coverage area. Further, the remote system is configured to transmit a downlink signal as a plurality of downlink signal streams. The host system is communicatively coupled to the base station and to the remote system and configured to relay the downlink signal streams from the base station to the remote system.

20 Claims, 5 Drawing Sheets

(56) References Cited

U.S. PATENT DOCUMENTS

| | | |
|---|---|---|
| 2002/0194285 A1 | 12/2002 | Mousseau et al. |
| 2003/0108031 A1 | 6/2003 | Inden |
| 2003/0134663 A1 | 7/2003 | Johansson et al. |
| 2004/0229614 A1 | 11/2004 | Kim et al. |
| 2005/0272367 A1 | 12/2005 | Rodgers et al. |
| 2005/0288060 A1 | 12/2005 | Kojima |
| 2006/0073849 A1 | 4/2006 | Kuriki et al. |
| 2006/0223530 A1 | 10/2006 | Bumiller |
| 2006/0245399 A1 | 11/2006 | Holur et al. |
| 2007/0036123 A1 | 2/2007 | Armour et al. |
| 2007/0064641 A1 | 3/2007 | Laroia et al. |
| 2007/0072617 A1 | 3/2007 | Lewis et al. |
| 2007/0105549 A1 | 5/2007 | Suda et al. |
| 2007/0149250 A1 | 6/2007 | Crozzoli et al. |
| 2009/0082064 A1 | 3/2009 | Li et al. |
| 2009/0149221 A1 | 6/2009 | Liu et al. |
| 2009/0190536 A1 | 7/2009 | Zhang et al. |

METHOD AND SYSTEM FOR EXTENDING MULTIPLE INPUT MULTIPLE OUTPUT WIRELESS SERVICE

RELATED APPLICATION

This patent application claims priority to U.S. application Ser. No. 12/035,783, filed Feb. 22, 2008, the contents of which are entirely incorporated herein by reference, as if fully set forth in this application.

FIELD OF THE INVENTION

The present invention relates to wireless communication, and more particularly to multiple-input multiple-output (MIMO) systems and methods.

BACKGROUND

To improve communication capabilities, wireless communication systems may be configured for multiple-input multiple-output (MIMO) communications. MIMO systems employ two or more antennas for both transmission and reception. By utilizing multiple antennas, MIMO systems may improve wireless communications by providing signal diversity, and/or channel diversity. MIMO signals that enhance signal diversity are particularly useful in cellular wireless networks, where the landscape often makes line of sight transmission impractical.

In cellular networks, MIMO signals can be encoded using space-time coding, which is sometimes referred to as a diversity coding or Alamouti coding, to improve signal diversity. To transmit a signal encoded using space-time coding, a transmitting device transmits the same signal stream from multiple antennas. Further, the signal streams may be orthogonally coded in relation to each other. A receiving device with multiple antennas (preferably corresponding in number to the antennas of the transmitting device) may then receive the signal from multiple streams transmitted from the multiple antennas of the transmitting device. Such a configuration may result in signal gain at the receiving device.

MIMO systems may also employ spatial multiplexing to increase channel capacity. To employ spatial multiplexing, a high data rate signal may be divided into multiple signal streams. Each of these unique streams may then be transmitted on the same RF frequency from multiple antennas of a transmitting device and received by multiple antennas of a receiving device. Spatial multiplexing maybe particularly helpful in communication channels with higher signal-to-noise (SNR) ratios to enable higher throughput than would be possible without this MIMO technique.

SUMMARY

A method and system for extending MIMO service is disclosed herein. In particular, a host system and remote system are configured to extend MIMO service from a base station, to areas where the base station itself does not directly provide MIMO service. The base station may provide MIMO service in a base coverage area. By linking a remote system to the base station via a host system, MIMO service may be extended to a remote coverage area. Further, multiple remote systems may be linked (via multiple host systems) to the base station, to extend MIMO service from the base station to a number of remote coverage areas.

In one aspect, a system comprising (a) a base station, (b) a remote system, and (c) a host system communicatively coupled to the base station and the remote system, is disclosed herein. Preferably, signals are conveyed between the base station, the remote system, and/or the host system via fiber-optic links, although other types of connections are possible.

The base station is configured to generate, from a baseband signal, a downlink signal comprising a plurality of downlink signal streams, including at least a first downlink signal stream and a second downlink signal stream. Further, the base station may provide wireless service in a base coverage area. Accordingly, the base station may include a first and a second antenna that are configured to wirelessly transmit the first and second downlink signal streams.

The remote system provides wireless service in a remote coverage area. Further, the remote system is configured to transmit a downlink signal as a plurality of downlink signal streams. In particular, the remote system includes a plurality of antennas, including at least a first remote antenna and a second remote antenna. The remote system may be configured to transmit the downlink signal streams from these remote antennas.

The host system is communicatively coupled to the base station and to the remote system. The host system is configured to (a) receive the first downlink signal stream from the base station and convey the first downlink signal stream to the remote system for transmission through the first remote antenna and (b) receive the second downlink signal stream from the base station and convey the second downlink signal stream to the remote system for transmission through the second remote antenna.

The base station and/or remote system may employ various techniques to provide MIMO service in the base coverage area and/or the remote coverage area. For example, the downlink signal streams transmitted by the base station and/or the remote system may be encoded using space-time coding. Alternatively or additionally, the antennas of the base station and/or the antennas of the remote system may be configured to support spatial multiplexing. Use of other techniques and configurations are also possible.

Additionally, the remote system may be configured to receive uplink signal streams through the remote antennas. Such uplink signal streams may have been transmitted by a wireless communication device operating in the remote coverage area. The wireless communication device may have transmitted an uplink signal as the uplink signal streams. The remote system may also be configured to convey the uplink signal streams to the host system, which in turn, may convey the signal streams to the base station. The remote system may receive the signal streams as one or more combinations of the signal streams. Accordingly, the base station may be configured to (a) use the one or more combination functions of the uplink signal streams as a basis for isolating the uplink signal streams and (b) construct the uplink signal from the uplink signal streams.

In another aspect, a method for extending MIMO communication service is disclosed. In particular, the method helps extend MIMO service from a base station having a base coverage area, to a remote coverage area at least partially different from the base coverage area. The method comprises (a) at the base station, generating a downlink signal comprising two or more signal streams, (b) conveying the signal streams from the base station to a remote system. In turn, the remote system is operable to provide MIMO service in at least a portion of the remote coverage area. Accordingly, the method may further comprise the remote system wirelessly transmitting the signal streams over an air interface so that the signal streams may be received by a wireless communication device.

The signal streams may comprise at least two radio frequency (RF) signal streams that each carry the downlink signal. Alternatively or additionally, the signal streams may comprise at least a first radio frequency (RF) signal stream that contains a first portion of the downlink signal, and a second RF signal stream that contains a second portion of the downlink signal. The first portion of the downlink signal may be different or the same as the second portion of the downlink signal.

The method may further comprise the remote system transmitting the first and second RF signal streams through the first and second remote antennas, respectively. Further, the remote system may receive an uplink signal from a wireless communication device. The uplink signal may comprise a first and a second uplink signal stream. Therefore, the remote system may receive the first and the second uplink signal stream from the wireless communication device via the remote antennas.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which.

DETAILED DESCRIPTION

Disclosed herein is a system for extending multiple input multiple output (MIMO) service in a wireless communications network. Preferably, the system extends MIMO service provided by a base transceiver station in a radio access network, although other configurations are possible.

Figure 1A:
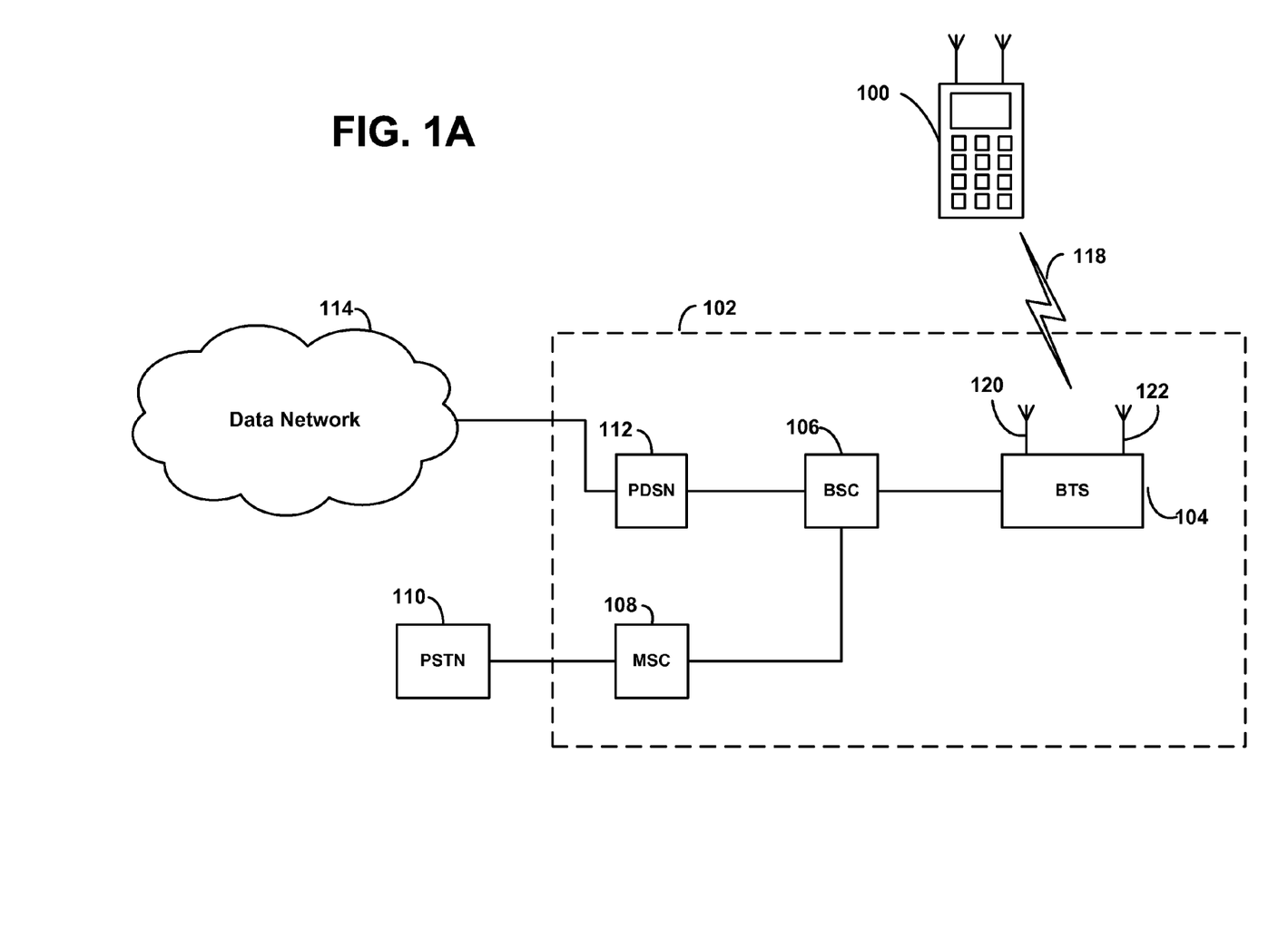
FIG. 1A is a simplified block diagram illustrating a wireless communication system.

FIG. 1A is a simplified block diagram depicting an exemplary wireless communication system. It should be understood the word "exemplary" is used herein to mean "serving as an example, instance, or illustration." Any embodiment described herein as "exemplary" is not necessarily to be construed as preferred or advantageous over other embodiments. Provided with access to the wireless communication system, a wireless communication device (WCD) 100 can engage in a communication session. The wireless communication system may include a radio access network (RAN) 102 that provides access to wireless services (e.g., cellular phone service; wireless data service, etc.) from a service provider. The RAN 102 may include a base station or base transceiver station (BTS) 104, a base station controller (BSC) 106, and a mobile switching center (MSC) 108.

WCD 100 may engage in communication sessions via BTS 104, BSC 106, and MSC 108. For example, WCD 100 may engage in voice communications with public switched telephone network (PSTN) 110 via MSC 108. As another example, WCD 100 may engage in data communications via packet data serving node (PDSN) 112, which provides access to a packet switched network 114 (such as the Internet, for instance). These examples are illustrative only. Preferably, the RAN 102 can provide multiple types of communication services, in addition, or as an alternative to, the communication services described herein.

In general, communications may involve uplink and/or downlink transmissions. Downlink transmissions are those transmissions that are ultimately intended for reception by a WCD (e.g., a transmission from a BTS 104 to WCD 100). Uplink transmissions are those transmissions that originated from a WCD (e.g., a transmission from WCD 100 to BTS 104).

The wireless communication system, and in particular, WCD 100 and BTS 104, may be configured to engage in multiple-input multiple-output (MIMO) communications. Accordingly, WCD 100 and BTS 104 may each be equipped with multiple antennas. BTS 104 may use space-time coding and/or spatial multiplexing to encode MIMO signals that are transmitted to WCD 100. BTS 104 may transmit the signal stream (if space-time coding is utilized) or multiple signal streams (if spatial multiplexing is utilized) over air interface 118 to WCD 100. WCD 100 may then receive the signal streams and use the signal streams to recover the original signal from which the signal streams were created.

WCD 100 and BTS 104 may each operate to send and receive MIMO signals. Therefore, it should be understood that both WCD 100 and BTS 104 may be similarly configured to receive, encode, transmit, and otherwise facilitate MIMO communications. For simplicity, some functionality (e.g., transmission, reception, etc.) may be described in reference to only a WCD or only a BTS. However, such descriptions should not be construed as limiting the scope of the invention. Any MIMO-capable device may be configured for any MIMO functionality disclosed herein.

Figure 1B:
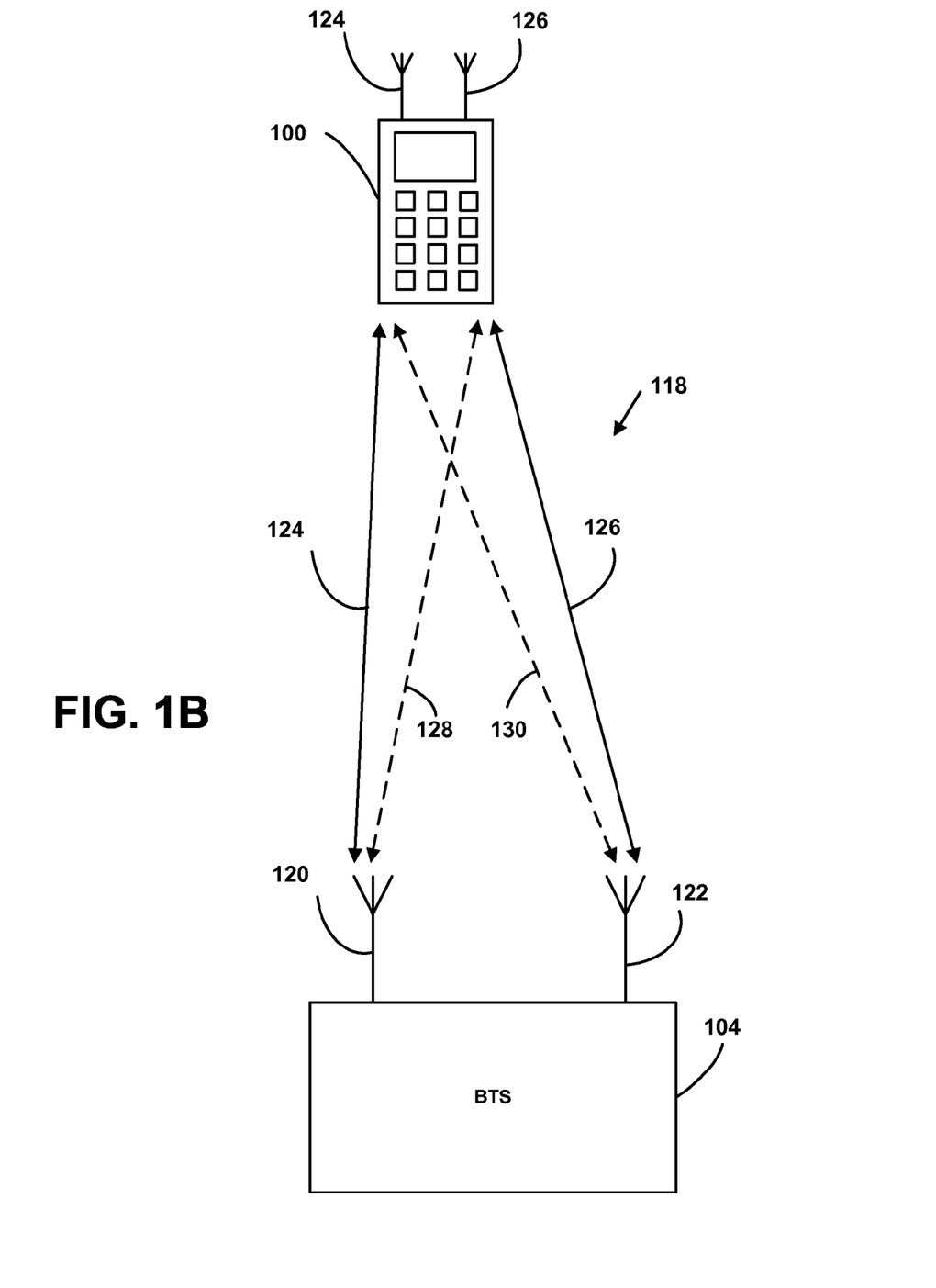
FIG. 1B is a simplified block diagram depicting signal paths between a wireless communication device and a base station.

The system illustrated in FIG. 1B is configured as a 2×2 MIMO system. More specifically, BTS 104 is equipped with two antennas for transmitting/receiving MIMO signals. Likewise, WCD 100 is equipped with two antennas for transmitting/receiving MIMO signals. It should be understood that while a 2×2 MIMO system is described, any type of MIMO system (3×3, 4×4, 5×5, etc.) may be extended. Preferably, all entities participating in the MIMO communication are equipped with an equal number of antennas. However, entities with unequal number of antennas may also form MIMO systems (e.g., 2×3, 3×2, 4×5, etc.), and any entity with two or more antennas may engage in MIMO communications. For example, if a BTS, having five antennas engages in a MIMO communication session with a WCD having three antennas, the disparity in antenna quantity may be detected (by the WCD or BTS) and the WCD and BTS may responsively engage in a 3×5 MIMO communication session. The amount of throughput gain for spatial multiplexing is generally dependant on the size of the matrix created by the MIMO system, and thus increasing the number of antennas anywhere in a MIMO system may improve throughput.

FIG. 1B is a simplified block diagram depicting signal paths between WCD 100 and BTS 104. BTS 104 may be configured to generate MIMO signal streams from a baseband signal and to transmit the MIMO signals over air interface 118 to WCD 100. In particular, BTS 104 may transmit MIMO signal streams via antennas 120, 122. The transmitted MIMO signal streams, or combinations of the signal streams, may be received at antennas 124, 126 of WCD 100.

Antennas 120, 122 are preferably spaced by at least 10 wavelengths, although other configurations are possible. BTS 104 is configured to transmit MIMO signal streams Tx1 and Tx2 from antennas 120, 122 (respectively), via signal paths 124, 126 (respectively), to WCD 100. WCD 100 also has two antennas for receiving signals over air interface 118 (via signal paths 124-130). Preferably, the antennas of WCD 100 are separated by at least a 0.3 wavelengths, although other configurations are possible.

Since Tx1 and Tx2 are transmitted over an air interface, each antenna of WCD 100 may receive both Tx1 and Tx2. More specifically, a first antenna of WCD 100 receives Tx1 via signal path 124 and Tx2 via signal path 130, and a second antenna of WCD 100 receives Tx2 via signal path 126 and Tx1 via signal path 128. Therefore the signal received at each antenna of WCD 100 may be described as a combination function of Tx1 and Tx2. The combination function received at each antenna of WCD 100 may be represented as $f_1$(Tx1, Tx2) and $f_2$(Tx1, Tx2), respectively.

WCD 100 is configured to reconstruct Tx1 and Tx2 from the received combination functions. To facilitate reconstruction of Tx1 and Tx2, BTS 104 may transmit Tx1 and Tx2 so that the signal paths of Tx1 (signal paths 124, 128) in the signal path of Tx2 (signal paths 126, 130) are decorrelated. Further to this end, antennas 120, 122 may be physically or angularly separated. For example, antennas 120, 122 may be physically separated by 10 wavelengths or may be cross-polar to each other (i.e. angularly separated by 90 degrees). Other configurations are also possible. MIMO signal streams transmitted by WCD 100 and received by BTS 104 may operate similarly. Techniques for implementing MIMO systems directly between a WCD and BTS are well known to those skilled in the art.

Figure 2:
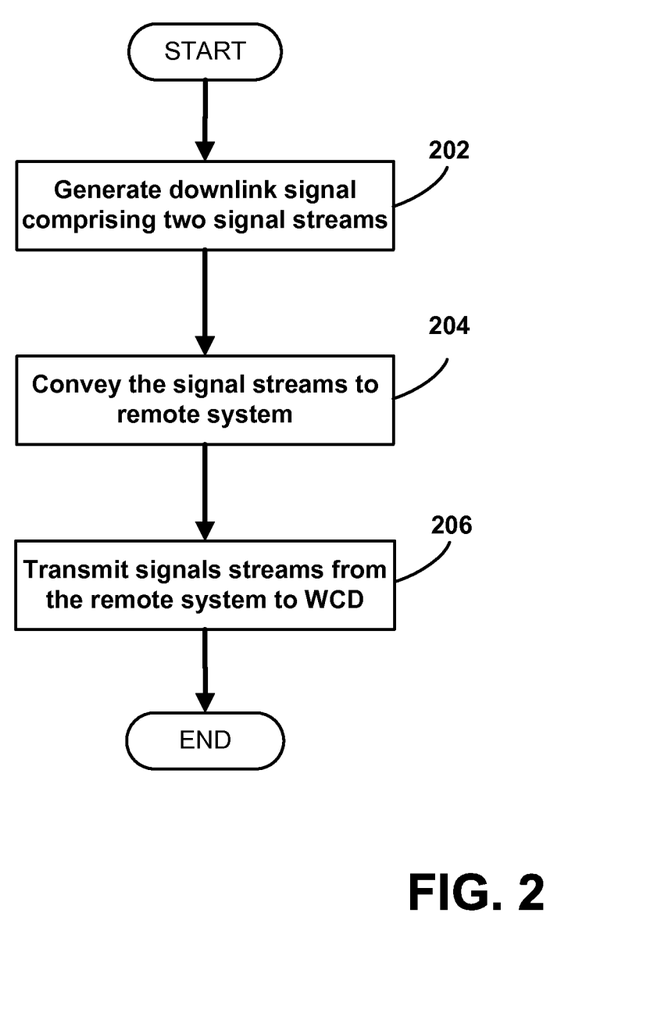
FIG. 2 is a simplified flowchart depicting a method for extending MIMO service.

FIG. 2 is a simplified flowchart depicting a method for extending MIMO service. In particular, the method helps to extend service beyond a BTS coverage area to a remote coverage area that is serviced by a remote system. For simplicity, the method may be described as being carried out by a BTS, a host system, and/or a remote system. However, various combinations of these entities and/or other entities may be used to implement the method. Initially, a BTS generates a downlink signal comprising two or more signal streams, as shown by block 202. The BTS then sends the signal streams to a remote system, as shown by block 204. In turn, the remote system transmits the signal streams to a WCD, as shown by block 206. Preferably, the WCD can decorrelate the signal streams and reconstruct the downlink signal.

The downlink signal may be received by a BTS and ultimately intended for reception by a first WCD. Further, the downlink signal may be a signal received from various sources. For example, the downlink signal may originate from a second WCD or a landline telephone, and arrive at the BTS as a transmission from the second WCD or the landline telephone to the first WCD.

To provide MIMO service, the BTS may create two or more signal streams from the downlink signal. The signal streams may be created using techniques such as space-time or Alamouti coding, among others. Further, the signal streams, may each communicate with the entire downlink signal, or alternatively, may each include a portion of the downlink signal. The signal streams may then be conveyed to the remote system.

Preferably, the signal streams are transmitted from the BTS to the remote system via a fiber optic link or links, although other connections or combinations of connections are possible. More specifically, in the preferred embodiment, the signal streams are conveyed from the BTS to the remote system via a host system, with fiber-optic links connecting the host system to the BTS and remote system. After receiving the signal streams, the remote system may transmit the signal streams to the WCD.

Figure 3:
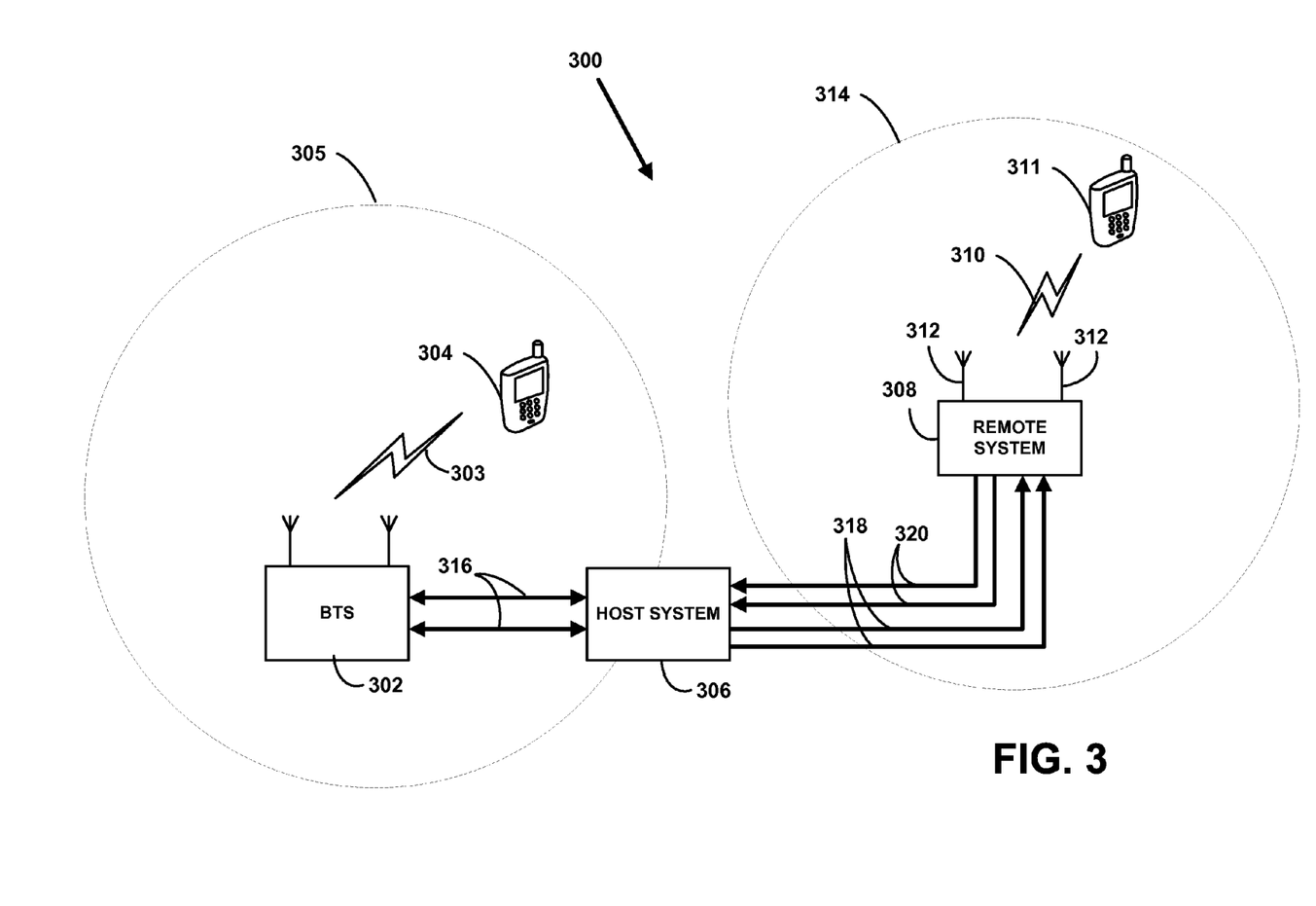
FIG. 3 is a simplified block diagram illustrating a wireless communication system that is configured to extend MIMO service.

FIG. 3 is a simplified block diagram illustrating a wireless communication system 300 that is configured to extend MIMO service. The system includes a BTS 302 operable to provide MIMO service over air interface 303 to WCD 304. More generally, BTS 302 may provide MIMO service in coverage area 305. The system also includes a host system 306 and a remote system 308 for extending MIMO service from BTS 302. In particular, MIMO signals may be sent by BTS 302 via host system 306, remote system 308, and air interface 310, to WCD 311. Likewise MIMO signals may be sent by WCD 311 to BTS 302 via air interface 310, remote system 308, and host system 306. This arrangement may help extend MIMO service beyond the coverage area of BTS 302 (i.e. beyond the area where service is available from the antennas of BTS 302). In particular, the antennas of the BTS 302 may provide MIMO service in coverage area 305, and the antennas 312 of remote system 308, may operate to extend MIMO service to coverage area 314.

It should be understood that coverage areas 305, 314 are for illustrative purposes only. Coverage areas may take many shapes and vary in size. Further, there may be gaps between coverage areas (as between coverage area 305 and coverage area 314) or coverage areas may overlap. Yet further, it should be understood that while the remote system may be referred to as providing service in a remote coverage area that is different from the base coverage area (where service is provided directly by the BTS), the service in the remote coverage area is ultimately provided by the BTS via the remote system. Therefore, it is conceptually equivalent to state that the remote system simply extends the base coverage area to include the remote coverage area.

Preferably, signal paths 316 between BTS 302 and host system 306, as well as signal paths 318, 320 between host system 306 and remote system 308, are fiber-optic links, although other types of connections, both wired and wireless, are possible. Further, combinations of different types of connections may be used. Each of the signal paths 316, 318, 320 may also be referred to as channels. For simplicity, this disclosure may generally refer to channels or signal paths 316, 318, 320 existing on fiber optic cables or fiber-optic links. However, this should not be construed to limit the scope in regards to other types of connections, between a BTS, a host system, and/or a remote system. The signal paths or channels may be implemented with a single fiber-optic link, or may be distributed among multiple links.

BTS 302 and host system 306 may employ frequency division duplexing (FDD) and/or time division duplexing (TDD) to facilitate transmission and reception of MIMO communications. Similarly, FDD and/or TDD may be employed for transmission and reception between host system 306 and remote system 308, and transmission and reception between remote system 308 and WCD 311.

Preferably, BTS 302 and host system 306 communicate using FDD. Therefore, two channels, represented by signal paths 316, can support uplink and downlink signals between BTS 302 and host system 306. However, host system 306 and remote system 308 preferably communicate using FDD. More specifically, host system 306 may be configured to substantially control operation of remote system 308. Thus, if the host system 306 is receiving a communication from BTS 302 for transmission to remote system 308, the host system may instruct the remote system to configure antennas 312 to transmit signals from the signal paths 318. In addition, remote system 308 may transmit signals received from WCD 311 to host system 306 via signal paths 320.

BTS 302 may encode an outgoing communication according to one of various MIMO protocols (e.g., space-time coding, spatial multiplexing, etc.). For example, BTS 302 may encode an outgoing indication as two signals, Tx1 and Tx2. Each of the signals Tx1 and Tx2 may be then sent to host system 306 over a fiber-optic link (e.g., via signal paths 316). As a result, host system 306 receives Tx1 and Tx2 over separate channels and can separately understand each signal. It should be understood that Tx1 and Tx2 may be encoded in substantially the same way for transmission over air interface 303 to WCD 304 and for transmission over fiber-optic cables 316.

After the host system 306 receives Tx1 and Tx2 from BTS 302, host system 306 may send each of Tx1 and Tx2 over fiber-optic link 318 to remote system 308. Host system 306 may simply forward Tx1 and Tx2 to remote system 308, or may process Tx1 and Tx2 before sending the signals to remote system 308. In either case, remote system may then transmit each of Tx1 and Tx2 over one of antennas 312.

Preferably, WCD 311 receives Tx1 and Tx2 from a remote system 308 just as the WCD would if it were communicating directly with a BTS (e.g. in the same way WCD 304 receives signals from the antennas of BTS 302). Therefore, from the perspective of the WCD, there is no difference whether it is communicating via a remote system extending service from a BTS or the BTS itself. In such embodiments, the WCD need not be modified for compatibility with systems that extend MIMO service using remote systems.

The remote system 308 may essentially be controlled by host system 306. More specifically, host system 306 may indicate to remote system 308 that downlink signal streams should be transmitted to WCD 311, or may monitor/query the remote system to determine whether an uplink signal is being received from WCD 311. Additionally or alternatively, host system 306 may be configured to execute any control logic helping with transmission and/or reception of downlink or uplink signals.

Host system 306 may also include or have access to a GPS receiver (not shown). The GPS receiver may be used to synchronize the host system with the BTS.

Remote system 308 includes antennas 312 for sending MIMO signal streams to WCD 311 over air interface 310. Preferably, antennas 312 are spatially or angularly decorrelated. For example, antennas 312 may be located 10 wavelengths apart, or they may configured to receive different polarizations. The signal streams transmitted by remote system 308 may be received and understood by WCD 311 just as any other MIMO transmission.

Remote system 308 may also be configured to receive MIMO signal streams Tx1 and Tx2 from WCD 311 over air interface 310. Since Tx1 and Tx2 are transmitted over an air interface, each antenna 312 may receive a combination function of Tx1 and Tx2 (e.g. F(Tx1, Tx2)). Preferably, remote system 308 simply relays signals received from WCD 311 to host system 306 via fiber links 320. As such, host system 306 receives a combination function of Tx1 and Tx2 over each fiber link 320. Host system 306 may then transmit the received signals (i.e.; the combination functions) to BTS 302. A BTS 302 may then isolate the signal streams Tx1 and Tx2 and use Tx1 and Tx2 to reconstruct the uplink signal from WCD 311. Alternatively, host system 306 or remote system 308 may be configured to reconstruct the uplink signal from WCD 311.

Figure 4:
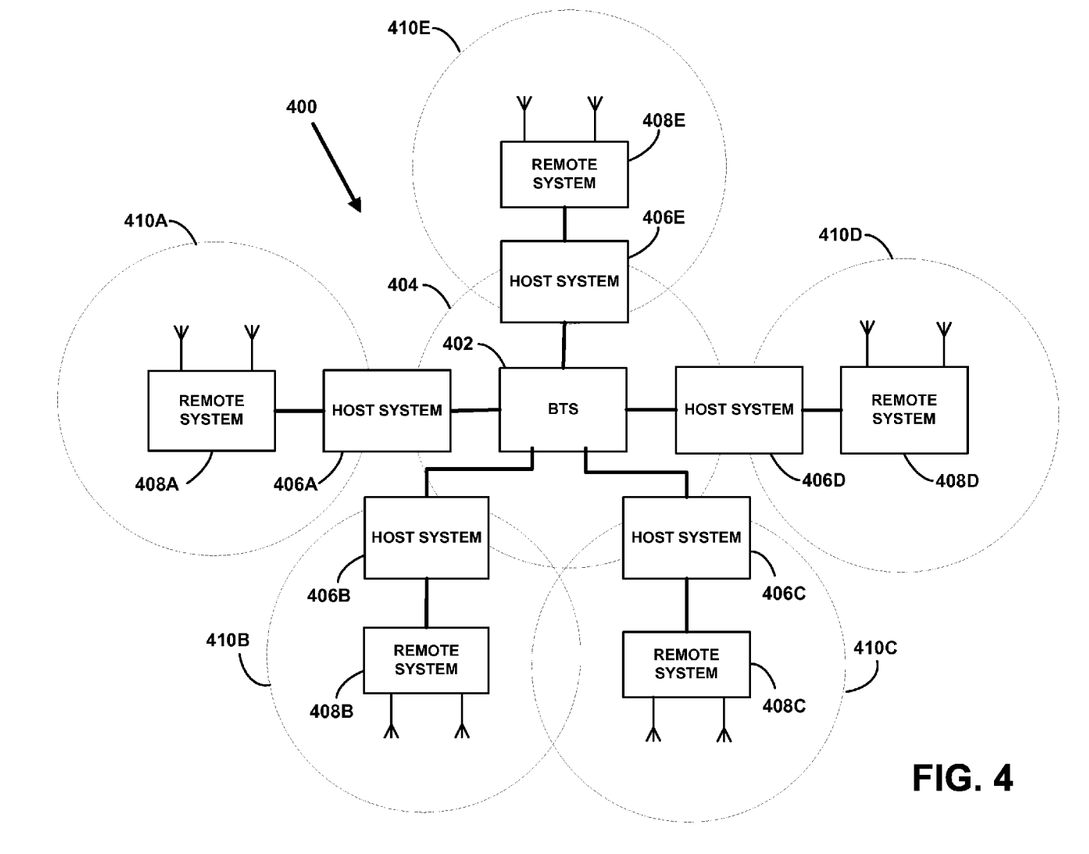
FIG. 4 is another simplified block diagram illustrating a wireless communication system that is configured to extend MIMO service.

FIG. 4 is another simplified block diagram illustrating a wireless communication system 400 that is configured to extend MIMO service. Wireless communication system 400 includes BTS 402 that provides wireless service in BTS coverage area 404. The system also includes host systems 406A-E and remote systems 408A-E, which are configured to extend MIMO service from BTS 402 to remote coverage areas. 410A-E. Each remote system 408A-E communicates with BTS 402 via the respective host system for the remote system (e.g. remote system 408A communicates with BTS 402 via host system 406A, etc.). Further, each remote system 408A-E extends MIMO service from BTS 402, to the remote system's respective remote coverage area 410A-E.

Each remote system 408A-E, each host system 406A-E, and BTS 402 may function in substantially the same manner as remote system 308, host system 306, and BTS 302. However, remote systems 408A-E, host systems 406A-E, and BTS 402 may be configured so that each coverage area 410A-E are geographically near to, adjacent, or overlapping with, the other coverage areas.

Preferably, host systems 406A-E are connected to BTS 402 and remote systems 408A-E with fiber-optic links. It should be understood, however, the different types of connections or combinations of connections may be employed without departing from the scope of the invention. Further, the connections or signal paths between BTS 402, host systems 406A-E, and remote systems 408A-E are depicted as a single line for illustrative purposes only. One or multiple fiber links, each providing one or more signal paths, may be employed without departing from the scope of the invention.

In the previously described embodiments, the BTS performed most or all of the processing for generating MIMO signal streams (e.g. space-time coding, spatial multiplexing, etc.). However, some or all of this processing may be carried out by the host system or systems. Further, while the host system was described as substantially controlling the remote system, some or all control logic may be located in the remote system, rather than the host system.

Exemplary embodiments of the present invention have been described above. Those skilled in the art will understand, however, that changes and modifications may be made to these embodiments without departing from the true scope and spirit of the invention, which is defined by the claims.

We claim:

1. A system comprising:
    a remote system configured to extend the wireless service of a base station to a remote coverage area, the remote system having a plurality of antennas, including at least a first remote antenna and a second remote antenna, wherein the remote system is configured to wirelessly transmit at least a first and a second downlink signal stream from a plurality of downlink signal streams via the first and second remote antennas; and
    a host system that is configured to be coupled to the base station and to the remote system, the host system being further configured to:
        receive the first downlink signal stream from the base station and convey the first downlink signal stream to the remote system for transmission through the first remote antenna; and
        receive the second downlink signal stream from the base station and convey the second downlink signal stream to the remote system for transmission through the second remote antenna;
    wherein the base station is configured to provide wireless service in a base coverage area, and wherein the base station is further configured to generate from a baseband signal, a downlink signal comprising the plurality of downlink signal streams that includes at least the first and the second downlink signal stream.

2. The system of claim 1, wherein the base station comprises a plurality of antennas, including at least a first base station antenna and a second base station antenna, and wherein the base station is configured to generate the first downlink signal stream and the second downlink signal stream from a baseband signal and to transmit the first downlink signal stream through the first base station antenna and the second downlink signal stream through the second base station antenna.

3. The system of claim 1, wherein the first and second downlink signal streams are space-time coded.

4. The system of claim 1, wherein the first and second remote antennas are configured to support spatial multiplexing.

5. The system of claim 1, wherein the first and second remote antennas are configured to support space-time coding.

6. The system of claim 1, wherein at least one fiber-optic link carries the first and second downlink signal streams between the host system and the remote system.

7. The system of claim 1, wherein at least one fiber-optic link carryies the first and second downlink signal streams between the base station and the host system.

8. The system of claim 1, wherein the remote system is further configured to:
receive a plurality of uplink signal streams through the first and second remote antennas, wherein a wireless communication device operating in the remote coverage area transmits an uplink signal as the uplink signal streams; and
convey the uplink signal streams to the host system.

9. The system of claim 8, wherein the host system is configured to convey the uplink signal streams to the base station.

10. The system of claim 9, wherein the base station is configured to transmit the downlink signal streams and to receive the uplink signal streams using time division duplexing.

11. The system of claim 8, wherein the host system is configured to transmit the downlink signal streams and to receive the uplink signal streams using frequency division duplexing.

12. The system of claim 8, wherein the uplink signal streams are received by the remote system as one or more combinations of the plurality of uplink signal streams.

13. The system of claim 12, wherein the base station is further configured to:
use the one or more combinations of the uplink signal streams as a basis for isolating the uplink signal streams; and
construct the uplink signal from the uplink signal streams.

14. A method for extending multiple-input multiple-output (MIMO) communication service from a base station having a base coverage area, to a remote coverage area, wherein the remote coverage area is at least partially different from the base coverage area, the method comprising:
a host system receiving a plurality of signal streams that comprise at least a first and a second signal stream, and wherein a downlink signal generated by the base station comprises at least the first and the second signal stream;
the host system conveying the received signal streams to a remote system wherein the remote system extends the MIMO communication service of the base station to at least a portion of the remote coverage area, and wherein the host system substantially controls the remote system; and
the host system indicating to the remote system to wirelessly transmit the signal streams via a plurality of antennas of the remote system, wherein the plurality of antennas include at least a first remote antenna and a second remote antenna, and wherein the first remote antenna is configured to transmit the first signal stream and the second remote antenna is configured to transmit the second signal stream.

15. The method of claim 14, wherein the signal streams comprise at least a first radio frequency (RF) signal stream containing a first portion of the downlink signal and a second RF signal stream containing a second portion of the downlink signal.

16. The method of claim 14, wherein the signal streams comprise at least a first radio frequency (RF) signal stream containing the downlink signal and a second RF signal stream containing the downlink signal.

17. The method of claim 16, wherein conveying the received signal streams to the remote system comprises conveying the signal streams via at least one fiber-optic link.

18. The method of claim 14, further comprising:
the host system receiving, from the remote system a first and a second uplink signal stream associated with a mobile station operating in the remote coverage area, wherein the first and second uplink signal streams are received via the first and second remote antennas, respectively;
the host system conveying the first and second uplink signal streams from the remote system to the base station to facilitate the combination of the first and second uplink signal streams, by the base station, to create a combined uplink signal.

19. A host system comprising:
one or more communication interfaces that communicatively couple the host system to a base station and to a remote system, wherein the host system substantially controls the remote system, wherein the remote system is configured to extend the wireless service of the base station to a remote coverage area, wherein the remote system having a plurality of antennas, including at least a first remote antenna and a second remote antenna, and wherein the remote system is configured to wirelessly transmit at least a first and a second downlink signal stream from a plurality of downlink signal streams via the first and second remote antennas;
wherein the host system is configured to:
receive the first downlink signal stream from the base station and convey the first downlink signal stream to the remote system for transmission through the first remote antenna; and
receive the second downlink signal stream from the base station and convey the second downlink signal stream to the remote system for transmission through the second remote antenna;
wherein the base station is configured to provide wireless service in a base coverage area, and wherein the base station is further configured to generate from a baseband signal, a downlink signal comprising the plurality of downlink signal streams that includes at least the first and the second downlink signal stream.

20. The system of claim 19, wherein one or more fiber-optic links carry the first and second signal streams between the host system and the remote system.

* * * * *